US012790553B2

(12) United States Patent
Sundaram

(10) Patent No.: US 12,790,553 B2
(45) Date of Patent: Nov. 10, 2026

(54) ADIABATIC OLEFIN PRODUCTION

(71) Applicant: Lummus Technology LLC, Houston, TX (US)

(72) Inventor: Kandasamy M. Sundaram, Houston, TX (US)

(73) Assignee: Lummus Technology LLC, Houston, TX (US)

( * ) Notice: Subject to any disclaimer, the term of this patent is extended or adjusted under 35 U.S.C. 154(b) by 139 days.

(21) Appl. No.: 18/972,328

(22) Filed: Dec. 6, 2024

(65) Prior Publication Data

US 2025/0188368 A1 Jun. 12, 2025

Related U.S. Application Data

(60) Provisional application No. 63/607,632, filed on Dec. 8, 2023.

(51) Int. Cl.
*C10G 9/36* (2006.01)
*B01J 19/00* (2006.01)

(52) U.S. Cl.
CPC ............ *C10G 9/36* (2013.01); *B01J 19/0013* (2013.01); *B01J 2219/00128* (2013.01); *C10G 2400/20* (2013.01); *C10G 2400/22* (2013.01)

(58) Field of Classification Search
CPC .. C10G 9/36; C10G 2400/20; C10G 2400/22; C10G 9/24; B01J 19/0013; B01J 2219/00128
See application file for complete search history.

(56) References Cited

U.S. PATENT DOCUMENTS

| | | | |
|---|---|---|---|
| 4,287,377 A | 9/1981 | Maslin et al. | |
| 6,685,893 B2 | 2/2004 | Platvoet et al. | |
| 9,494,038 B2 | 11/2016 | Bushuev | |
| 10,190,060 B2 * | 1/2019 | Van Willigenburg | ....................... C10G 9/002 |

(Continued)

FOREIGN PATENT DOCUMENTS

| | | |
|---|---|---|
| EP | 4056892 A1 | 9/2022 |
| GB | 2353802 A | 3/2001 |

(Continued)

OTHER PUBLICATIONS

Rubini et al. (A New Turbomachine for Clean and Sustainable Hydrocarbon Cracking; Journal of Engineering for Gas Turbines and Power, Feb. 2022, vol. 144). (Year: 2022).*

(Continued)

*Primary Examiner* — Ali Z Fadhel
(74) *Attorney, Agent, or Firm* — Osha Bergman Watanabe & Burton LLP

(57) ABSTRACT

Systems and processes for cracking hydrocarbons to produce olefins herein includes heating a hydrocarbon feedstock or a mixture comprising steam and hydrocarbons to a first temperature to form a preheated feed, and also include heating steam to a second, higher, temperature in a turbomachine to form a superheated reaction steam. The preheated feed is then mixed with the superheated reaction steam to form a reaction mixture at a cracking temperature, thereby cracking the hydrocarbons to form olefins, producing a reaction effluent. The reaction effluent is then quenched and separated effluent to recover the olefins.

21 Claims, 8 Drawing Sheets

(56) References Cited

U.S. PATENT DOCUMENTS

| | | | | |
|---|---|---|---|---|
| 2005/0209495 A1* | 9/2005 | McCoy | C10G 9/20 | |
| | | | 208/132 | |
| 2013/0001132 A1* | 1/2013 | Baumgartner | C10G 9/002 | |
| | | | 422/187 | |
| 2019/0153331 A1 | 5/2019 | Barrai et al. | | |
| 2020/0024525 A1* | 1/2020 | Dijkmans | C10G 9/36 | |
| 2024/0279558 A1* | 8/2024 | Brandt | C10G 9/002 | |

FOREIGN PATENT DOCUMENTS

| | | |
|---|---|---|
| JP | 2012-246892 A | 12/2012 |
| KR | 2017-0055469 A | 5/2017 |

OTHER PUBLICATIONS

International Search Report and Written Opinion issued in International application No. PCT/US2024/057545 dated Mar. 14, 2025 (9 pages).

* cited by examiner

ADIABATIC OLEFIN PRODUCTION

FIELD OF THE DISCLOSURE

Embodiments of the present disclosure generally relate to steam cracking of hydrocarbons to form olefins.

BACKGROUND

To produce ethylene, a hydrocarbon, such as ethane, LPG, naphtha and/or gas oils, is typically heated in the convection section of a fired heater and mixed with dilution steam. The mixture (hydrocarbon plus dilution steam (HC+DS)) is further superheated in the convection section of the fired heater and then enters the radiant section of the fired heater. This mixture (HC+DS) is thermally cracked at high temperatures (such as 700° C. to 900° C., for example) and at short residence times (such as 0.2 to 0.4 sec, for example) in tubular reactors. The effluent is quickly cooled in transfer-line exchangers generating steam and thereby the reaction is frozen quickly. The cooled effluents are then sent to a recovery section for product recovery.

With a fired heater, when a fluid is heated, the associated metal temperature is also hot and the achievable temperature is limited by the metallurgy. Thus, maximum temperatures of the tubes within the radiant section are often limited. Furthermore, fired heaters produce a significant amount of carbon dioxide, a further disadvantage of a fired system.

SUMMARY OF THE CLAIMED EMBODIMENTS

In one aspect, embodiments disclosed herein relate to a process of cracking hydrocarbons to produce olefins. The process includes heating a hydrocarbon feedstock or a mixture comprising steam and hydrocarbons to a first temperature to form a preheated feed. The steam is then heated to a second, higher, temperature in a turbomachine to form a superheated reaction steam. The preheated feed is mixed with the superheated reaction steam to form a reaction mixture at a cracking temperature, and cracking the hydrocarbons to form olefins, producing a reaction effluent, which is then quenched to halt the reaction. The reaction effluent is then separated to recover the olefins.

In another aspect, embodiments disclosed herein relate to a system for cracking hydrocarbons to produce olefins. The system includes a heating system configured for heating a mixture comprising steam and hydrocarbons to a first temperature to form a preheated mixture. The system also includes a heating system comprising a turbomachine configured for heating steam to a second, higher, temperature to form a superheated reaction steam. A mixing system is provided for mixing the preheated mixture with the superheated reaction steam to form a reaction mixture at a cracking temperature. An adiabatic reaction zone is provided for adiabatically cracking the hydrocarbons to form olefins, producing a reaction effluent having a fourth temperature. Further, a quench system is provided for quenching the reaction effluent, and a separation system for separating the reaction effluent to recover the olefins.

In a further aspect, embodiments disclosed herein relate to a process of cracking hydrocarbons to produce olefins. The process includes heating a hydrocarbon feedstock or a mixture comprising steam and hydrocarbons to a first temperature to form a preheated feed. The process also includes heating steam in a turbomachine to form a superheated steam. The preheated feed is mixed with the superheated steam to form a reaction mixture having a temperature below a cracking temperature, and then the reaction mixture is heated in single stage turbomachine to a cracking temperature, cracking the hydrocarbons to form olefins, producing a reaction effluent. The process then includes quenching and separating the reaction effluent to recover the olefins.

In yet another aspect, embodiments disclosed herein relate to a system for cracking hydrocarbons to produce olefins. The system includes a first heating system configured for heating a mixture comprising steam and hydrocarbons to a first temperature to form a preheated mixture. The system also includes a second heating system comprising a turbomachine configured for heating steam to form a superheated steam having a temperature below a cracking temperature. A mixing system is provided for mixing the preheated mixture with the superheated steam to form a reaction mixture having a temperature below a cracking temperature. Further, the system includes a single stage turbomachine for heating the reaction mixture to a cracking temperature and cracking the hydrocarbons to form olefins, producing a reaction effluent. A quench system and a separation system are also provided for separating the reaction effluent to recover the olefins.

Other aspects and advantages will be apparent from the following description and the appended claims.

DETAILED DESCRIPTION

Figure 1:
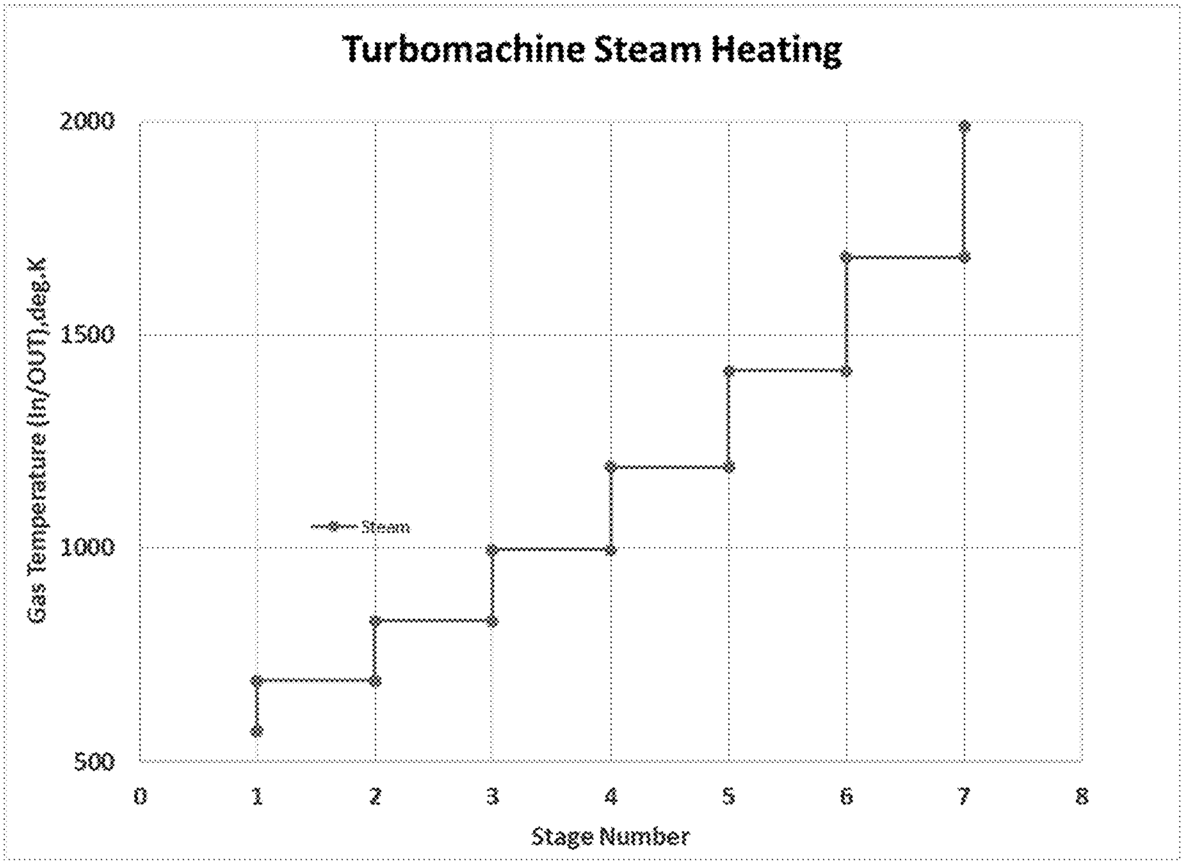
FIG. 1 illustrates typical temperature increase of steam in a seven stage axial compressor.

Embodiments herein relate to steam cracking of hydrocarbons to produce olefins. More particularly, embodiments herein relate to steam cracking of hydrocarbons to produce olefins where various heating duties are supplied by turbomachines. Even more particularly, some embodiments herein are directed toward systems and processes to produce olefins using only electrical heating, via turbomachines, to crack hydrocarbons in an adiabatic reactor.

Turbomachines, as used herein, refers to devices in which energy is transferred to a fluid by the dynamic action of one or more rotating turbines. Examples of machines that may be used to transfer energy between a rotor and a fluid includes both turbines and compressors. In some embodiments, axial compressors are used to heat a fluid in embodiments herein.

Turbomachines used in embodiments herein may be electrically driven, and in particular embodiments, are driven by green electricity.

Typically, in compressors, energy transfer results in an increase in both temperature and pressure. A compressor typically increases the pressure from inlet to outlet. With many stages, the outlet pressure can be increased by many times. However, in embodiments herein, the turbomachine is used for heating. When a compressor is used for heating the fluid instead of increasing pressure, additional supplied energy is converted to temperature. Pressure essentially remains constant from inlet to outlet. This is achieved by operating the compressor at supersonic speeds (as measured at a blade tip). When the fluid leaves the rotor, a shock wave is generated and reduces the pressure. This in turn increases the fluid temperature. Thus, in embodiments herein, the fluid is accelerated to high velocity (supersonic) at the tip of the rotor blade, and a shock wave is generated which reduces the pressure across a thin boundary, producing high temperature.

Turbomachines operated in this fashion may be used to increase the temperature of fluids to very high temperatures. In embodiments herein, steam is heated to very high temperature using a turbomachine, such as temperatures in the range from 800° C. to 1300° C. Then, the high temperature steam (termed "reaction steam" herein) is mixed with hydrocarbon or a hydrocarbon-steam mixture, rapidly raising the temperature of the hydrocarbon, from temperatures below or near the temperature at which thermal cracking occurs, to temperatures sufficient to thermally crack the hydrocarbons to form ethylene, propylene, and other chemicals. For example, the hydrocarbon or a steam-hydrocarbon mixture may be at a temperature in the range from 100° C. to 750° C., such as from 250° C. or 350° C. to 550° C. or 650° C. The pre-heated hydrocarbon may then be rapidly heated with the reaction steam to cracking temperatures, such as from 800° C. to 1200° C., such as 850° C. or 900° C. to 1000° C. or 1100° C. The mixing may occur rapidly, external to the turbomachine, in an adiabatic reactor. Following the adiabatic cracking reaction, the reactor effluent may be quenched to halt the cracking reaction, and the reaction products, including the desired olefins, may be recovered.

A hydrocarbon feedstock to be cracked in reaction systems according to embodiments herein may be any one of a wide variety of feedstocks, and may include individual hydrocarbon components (e.g., methane, ethane, propane, butane, etc.) or mixtures of two or more hydrocarbons (e.g., natural gas, butanes, pentanes, naphtha, gas oils, etc.). In some embodiments, the hydrocarbon feedstock may be derived from a whole crude oil, and may include one or more fractions of the crude oil, including light fractions (naphtha, diesel, etc.) as well as heavy fractions (gas oil, heavy cycle oil, etc.) or residue fractions that have been conditioned for use as a cracker feed.

The hydrocarbon feedstock, or a mixture of hydrocarbon feedstock and steam, is preheated to a temperature below the onset of the cracking reaction, such as to a temperature below 650° C. In some embodiments, the hydrocarbon feedstock, or a mixture of hydrocarbon feedstock and steam, is preheated to a temperature at which low rates of cracking are encountered, such as to a temperature below 750° C. In some embodiments, the hydrocarbon feedstock is heated to a desired preheat temperature, such as a temperature in the range from 300° C. to 650° C. In some embodiments, the hydrocarbon feedstock is heated to a first temperature, such as 150° C. to 350° C., mixed with steam, and then further heated to the desired preheat temperature, such as 300° C.° to 750° C. In various embodiments, the preheat temperature may be in a range from a lower limit of 150° C., 200° C., 250° C., 300° C., 350° C.°, 400° C., 450° C., or 500° C. to an upper limit of 550° C., 600° C., 625° C., 650° C., 675° C., 700° C., 725° C., or 750° C., where any lower limit may be paired with any upper limit.

The preheated hydrocarbon feedstock is then rapidly heated to a cracking temperature and cracked to form olefins, such as ethylene, propylene, and butenes, among other products. Cracking temperatures are those greater than the temperature at which the onset of cracking begins, which may depend upon the hydrocarbon feedstock. Cracking temperatures used in embodiments herein may be in a range from 750° C. to about 1300° C., such as from 900° C. to 1250° C., or from 950° C. to 1200° C., for example. In various embodiments, cracking temperatures may be in a range from a lower limit of 750° C., 780° C., 800° C., 850° C., 900° C., 925° C., 950° C., 975° C., 1000° C., 1025° C., or 1050° C. to an upper limit of 950° C., 975° C., 1000° C., 1025° C., 1050° C., 1100° C., 1150° C., 1200° C., 1250° C., or 1300° C., where any lower limit may be paired with any mathematically compatible upper limit.

To achieve the desired cracking temperatures, embodiments herein directly heat the preheated hydrocarbon feedstock, or the preheated hydrocarbon plus steam mixture, using superheated steam. Superheated steam used for the reaction according to embodiments herein is generated via turbomachines, which may be electrically driven. The superheated steam used to provide the heating of the hydrocarbons to cracking temperatures may be at a temperature in a range from 925° C. to about 1400°, for example. Admixture of the superheated reaction steam with the preheated hydrocarbon feedstock will rapidly increase the temperature of the hydrocarbons to cracking temperatures, resulting in the cracking of the hydrocarbons to form ethylene and other cracked hydrocarbon products. In various embodiments, the superheated reaction steam may be at a temperature in a range from a lower limit of 925° C., 950° C., 975° C., 1000° C., 1025° C., 1050° C., or 1100° C. to an upper limit of 1050° C., 1100° C., 1150° C., 1200° C., 1250° C., 1300° C., 1350° C., or 1400° C., where any lower limit may be paired with any mathematically compatible upper limit. Following admixture of the superheated reaction steam with the hydrocarbon feedstock, the endothermic cracking reaction then proceeds adiabatically, cooling the reacting mixture to an extent. In some embodiments, where it is desired to maintain the reaction temperature, additional heat input may be provided to offset the endothermic reaction. To maintain high selectivity to ethylene, reaction conditions (feed rates, feed temperatures, etc.) may be selected to provide a reaction effluent having a temperature greater than 750° C., such as greater than 800° C., greater than 825° C., greater than 850° C., greater than 875° C., or greater than 900° C.

The reaction effluent contains a variety of components, the concentrations of which are dependent upon the feedstock as well as the reaction severity (reaction temperature and residence time at cracking temperatures). Generally, the residence time at cracking temperatures is less than 0.5 seconds (less than 500 milliseconds). Due to the very high temperature of the superheated steam that may be used according to embodiments herein, and the minimal coking that results due to the direct heating of the hydrocarbons (contrary to radiant coils in a fired furnace), residence times used in embodiments herein may be in a range from 10 to 200 milliseconds, such as from 20 to 180 milliseconds, 30 to 170 milliseconds, 50 to 160 milliseconds, or 60 to 150 milliseconds, where any lower limit may be combined with any upper limit.

As noted in U.S. Pat. No. 6,685,893, it is generally recognized in the industry that for most feedstocks, and especially for heavier feedstocks such as naphtha, shorter residence times will lead to higher selectivity to ethylene and propylene since secondary degradation reactions will be reduced. Further it is recognized that the lower the partial pressure of the hydrocarbon within the reaction environment, the higher the selectivity. Reactors according to embodiments herein may provide both higher temperatures than may result in a fired furnace, as well as short residence times, thus providing an advantageous yield of ethylene and propylene.

Following the rapid heating and short residence time at cracking temperatures, the reaction effluent may be rapidly cooled, quenched, to halt the cracking reaction. For example, direct or indirect heat exchange may be used to cool the reaction effluent to a temperature below about 700° C., such as to a temperature in a range from about 300° C. to about 600° C. Indirect heat exchange quenching of the reaction mixture may be conducted, for example, to preheat a water or steam stream, the hydrocarbon feedstock, or a hydrocarbon feedstock-steam mixture. In other embodiments, direct quenching of the reaction mixture may be conducted via admixture of the reaction effluent with steam, a cycle oil, gas oil, or other hydrocarbon medium.

The resulting quenched reaction effluent may then be fed to a cooling and recovery section to further cool and separate the effluent to recover the water/steam and one or more hydrocarbon fractions. The recovery section may include various separation devices, such as distillation columns, extractive distillation, flash drums, strippers, and other unit operations commonly used for separation of mixtures to recover one or more chemical streams, such as ethylene, propylene, and butenes, among others, such as a higher boiling pyrolysis oil fraction.

The hydrocarbon-steam mixture may have a steam to hydrocarbon ratio in a range from 0.05 to 1.2 w/w. As the preferred steam to hydrocarbon ratio may depend upon the hydrocarbon feedstock being processed, as well as the desired preheat temperature, whether below onset of cracking or with a small amount of cracking, steam to hydrocarbon ratios for the hydrocarbon-steam mixture may be in a range from a lower limit of 0.05, 0.1, 0.15, 0.2, 0.25, 0.3, 0.35, 0.4, 0.45, or 0.5 w/w to an upper limit of 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1.0, 1.1, or 1.2 w/w, where any lower limit may be combined with any mathematically compatible upper limit.

The hydrocarbon feedstock, or hydrocarbon-steam mixture may be mixed with the superheated reaction steam at an appropriate rate to form a reaction mixture having the desired cracking temperature. The ratios used may depend upon the desired steam to oil ratios, reaction residence times, initial temperature of the streams, as well as the heat capacity of the hydrocarbon feedstock, among other factors. In some embodiments, the reaction mixture may have a steam to hydrocarbon ratio in a range from a lower limit of 0.25, 0.5, 0.75, 1.0, 1.5, or 2.0 w/w to an upper limit of 3.0, 4.0, 5.0, 6.0, 7.0, 8.0, 9.0, 10.0 or higher, where any lower limit may be combined with any upper limit.

Heating of the hydrocarbon feedstock may be conducted in one or more exchangers or heaters. For example, heat recovery from various process streams may be used to heat the hydrocarbon feedstock via indirect heat exchange. Additionally, or alternatively, electric heaters may be used to heat the hydrocarbon feedstock. The electric heaters may be radiative type electric heaters, direct heating type electric heaters, inductive type electric heaters, or inductive heating with susceptors. In some embodiments, the electricity provided to the electric heaters may be "green" electricity, thus making the overall process more environmentally friendly. Turbomachines, operated at outlet temperatures well below the onset of cracking, may also be used to pre-heat the hydrocarbon feedstock, if desired.

Heating of the dilution steam, and heating of the hydrocarbon feedstock plus dilution steam mixture may be conducted in similar manners. For example, heat recovery from various process streams may be used to heat the dilution steam or the hydrocarbon feedstock plus dilution steam via indirect heat exchange. Additionally, or alternatively, electric heaters or turbomachines may be used to heat or partially heat the dilution steam or the hydrocarbon feedstock plus dilution steam mixture. The electric heaters may be radiative type electric heaters, direct heating type electric heaters, inductive type electric heaters, or inductive heating with susceptors.

Heating of the superheated reaction steam may also be conducted in similar manners. Initial heating of the steam may be performed by heat exchange (heat recovery) against various process streams, such as the reactor effluent. Heating of the reaction steam to the desired reaction steam temperatures may be performed in stages. One or more stages may include using electric heaters, and in particular embodiments, using inductive heating with susceptors. For example, susceptor particles may be disposed within a tube receiving a steam feed, the susceptor particles being heated via a current applied across an electric coil disposed external to the tube, thereby heating the steam feed. Resistive heating (radiation), direct resistance heating (using radiant coil as resistance) and inductive heating differ in mode of heating. Inductive heating with susceptors is another excellent method of heating, as with this approach only the fluid is heated. Hence all electric energy is directed to heating dilution or reaction steam and the heat is generated internally, as there is no heating element for radiation.

Embodiments herein heat, or further heat the reaction steam to the maximum reaction steam temperatures used using turbomachinery. The reaction steam is heated to very high temperatures, such as greater than 950° C. or greater than 1000° C., as noted earlier. Such reaction steam temperatures as achievable with electrically driven turbomachines, such as an axial compressor. Further, such turbomachines may provide for a reaction mixture having temperatures much higher than typical for fired heaters.

In embodiments herein, instead of heating a mixture of hydrocarbon and dilution steam together in a turbomachine, only dilution steam is heated to high temperature and the superheated dilution steam is mixed with the superheated hydrocarbon vapors externally in a different vessel. In the external vessel the hydrocarbon is reacted and by this process the fluid is also cooled adiabatically. Following reaction, transferline exchangers can be used to freeze the reactions and to generate valuable superhigh pressure steam.

By this approach the turbomachine heats only the dilution steam and hence there is no issue of coke formation and stable operation is achieved. No coke is formed in the turbomachine. Coke may be formed in the external vessel and it can be cleaned using steam only or optional steam/air method. A spare reactor vessel can be used, operating in parallel, and thus when a reactor is being cleaned, continued reaction and chemicals production may be performed. In other words, the turbomachine may run continuously for generating high temperature steam. With a spare reactor vessel, olefin is also produced continuously.

In embodiments herein, turbomachinery as a general term is used. It refers to both single and multistage axial and centrifugal compressors. However, axial compressors may be used in particular embodiments.

A compressor increases the pressure from inlet to outlet. With many stages the outlet pressure can be increased manyfold. However, when a compressor is used for heating the fluid instead of pressure, additional supplied energy is converted to temperature. Pressure essentially remains constant from inlet to outlet. This is achieved by operating the compressor at supersonic speeds (at blade tip). When the fluid leaves the rotor, a shock wave is generated and reduces the pressure. This in turn increases the fluid temperature.

Typical temperature increases of steam as a working fluid in an axial compressor is shown on a no loss basis in FIG. 1. Actual temperatures will be slightly lower due to losses and non-ideality of the fluid. Nevertheless, with seven stages, more than 1300 K temperature differences between outlet and inlet of the axial compressor can be achieved. High temperature is limited to the fluid only and the surrounding material will be slightly cold. By upgrading the metallurgy and proper design, high temperatures sufficient for the desired cracking reactions can be achieved. Note that steam does not coke and acts as inert material. Typical operating temperature of pyrolysis reactors is 750-1000° C. By reducing the residence time, the selectivity to olefins can be increased significantly. Steam may be generated in the plant at a pressure in the range of 5-8 bara, for example, and the steam can be heated, for example, to 573 K with locally available hot fluids. Even if steam is available only at low temperature, it can be heated to more than 1700 K using the turbomachine. Accordingly, instead of heating the reaction mixture (HC+dilution steam), only the reaction steam is heated to very high temperatures, much higher than the reaction temperature. This superheated reaction steam is mixed with preheated hydrocarbon (and optional small quantity of dilution steam) mixture. It is well known that at high temperatures hydrocarbons decompose and they form coke. Therefore, hydrocarbon is preheated to a sufficient level (800-1000 K), the temperature depending upon the hydrocarbon feed, to a temperature where coke formation is nil or essentially nil. To suppress the coking further, the hydrocarbon can be heated with some dilution steam (such as at a steam to oil ratio (S/O)=0.05 to 0.2 w/w). In the presence of steam, coke formation is suppressed. Therefore, with some steam, higher preheated temperatures can be used. This preheated hydrocarbon and steam mixture enters the adiabatic vessel. This could be a simple drum or a cylindrical vessel or pipe or any shape vessel or a typical cracking coil. An optional mixer can be used to mix both steam and hydrocarbon vapors. After mixing, the hydrocarbon in the entire mixture (hydrocarbon plus dilution steam plus reaction steam) is heated to high temperatures almost instantaneously. In the adiabatic vessel the reaction proceeds adiabatically.

Figure 2:
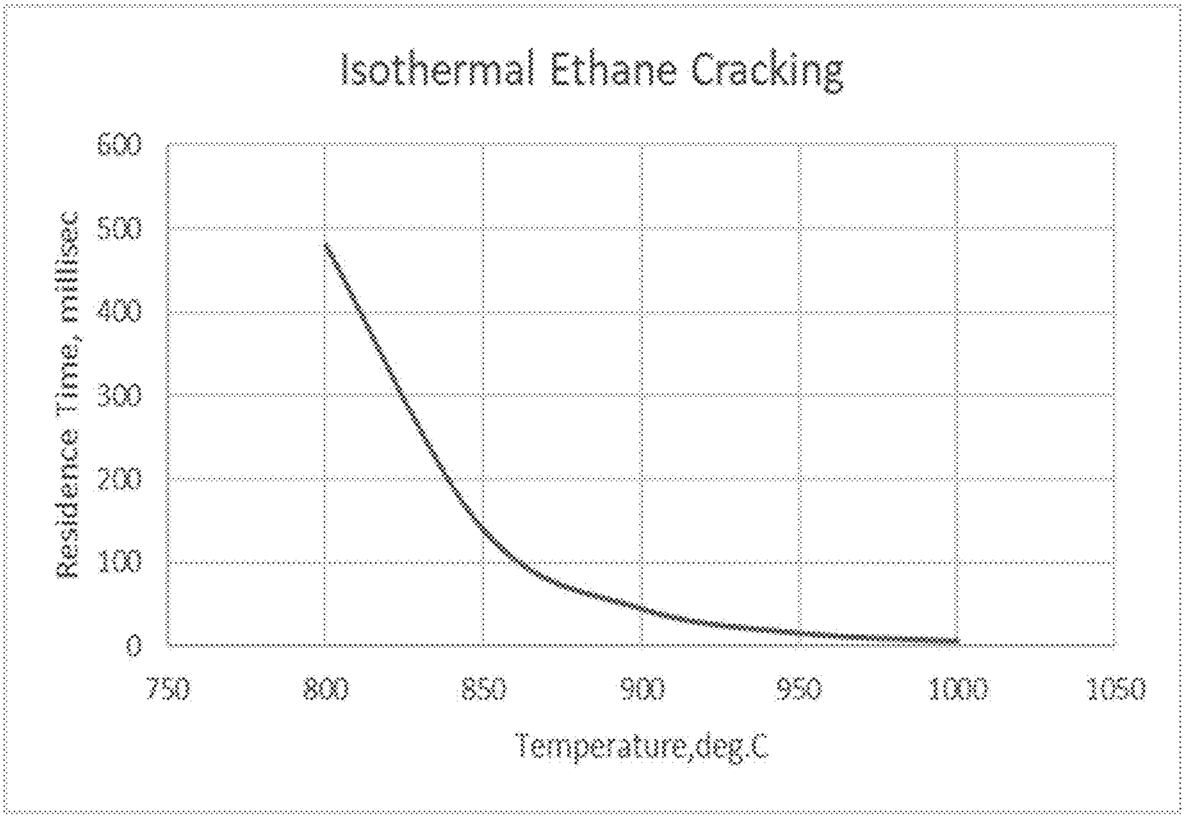
FIG. 2 illustrates typical residence times for isothermal ethane cracking at 65 mol % conversion.

FIG. 2 shows the residence time required at isothermal conditions at different temperatures to achieve 65% conversion for ethane feed. Adiabatic reactor residence time will be higher than this (isothermal) residence time and depends upon the initial temperature. With very high inlet temperature residence time is low. Conventional fired heaters nowadays operate between 100 and 400 milliseconds and coil outlet temperature varies from 800-950° C. Note that in fired heaters the inlet temperature known as cross over temperature is always much lower than the coil outlet temperature. Typically coil outlet temperature is the hottest process fluid temperature in a conventional reactor. Inside the reactor (coil) the gas temperature increases nonlinearly depending on the heating rate dictated by heat release in the firebox. In an adiabatic reactor, the temperature profile is reversed. It starts with very high temperature and cools off to a low temperature. Therefore, relatively short residence time (<100 millisecond) is achievable since average temperature in the reactor is always higher than the coil outlet temperature. Short residence time is always beneficial since it improves the olefin selectivity significantly. In addition, the reaction proceeds adiabatically and hence temperature is not limited by heat transfer rate. Always getting the highest inlet temperature is a challenge. In this case steam is heated to high temperatures and mixed instantaneously with hot hydrocarbon and thereby high temperature is achieved. Only the mixing controls the inlet temperature. Compared with convective or radiative heat transfer gas-gas mixing is very fast and additional static mixers or packing can be installed if necessary to enhance mixing. Though ethane is shown as an example, the concept can be applied to any feed from ethane to naphtha, gasoil and crudes.

Figure 3:
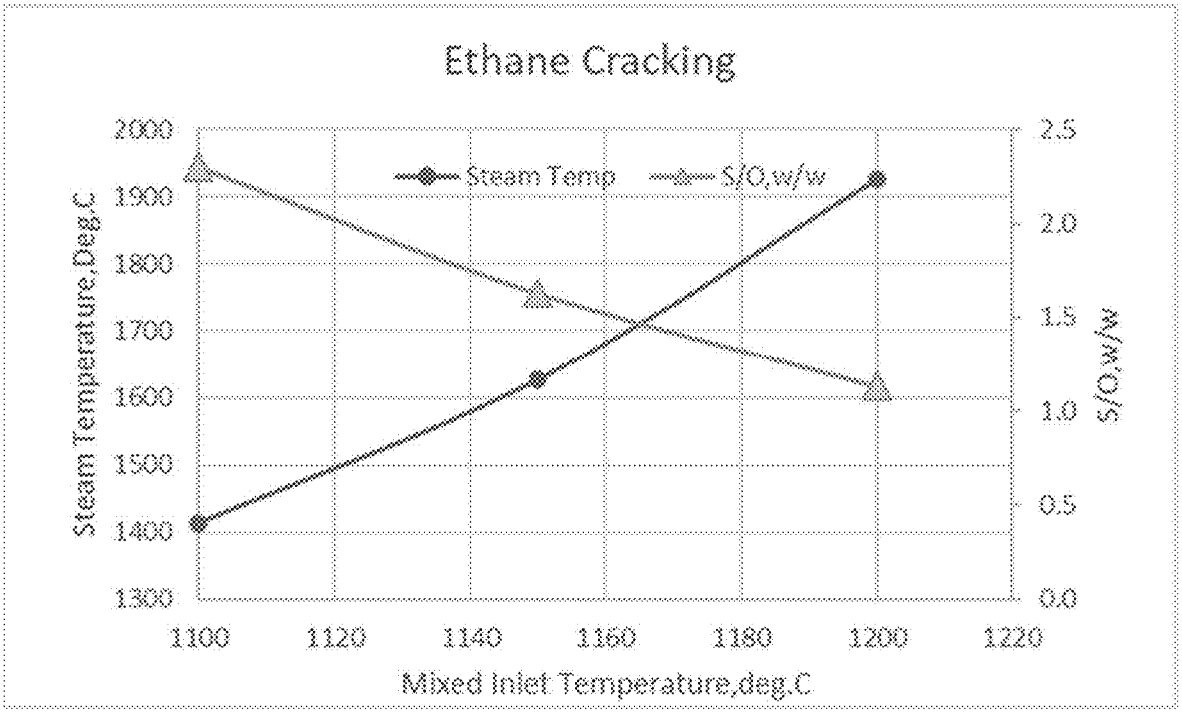
FIG. 3 is a chart illustrating steam temperature and overall steam to oil weight ratios (S/O) for different mixed inlet temperatures for an adiabatic reactor for ethane cracking.

When a turbomachine, such as an axial compressor, is used to heat only steam, for various mixture (hydrocarbon plus reaction steam) temperatures entering the adiabatic section require reaction steam temperatures at the turbomachine outlet are as shown in FIG. 3 for ethane cracking. With these effective mixed inlet temperatures, 65% ethane conversion can be achieved. Another variable to meet the heat balance is steam to oil ratio. To reduce the temperature at the turbomachine outlet, higher steam to oil can be used. By manipulating steam to oil ratio (or steam flow rate to the turbomachine) and steam outlet temperature at the outlet of the turbomachine, enough heat can be supplied as required for the process (i.e., to meet the endothermic duty for the reaction). Still, the temperature of the reactor effluent at the outlet of the adiabatic reaction section is high (>800 C) and the effluents have to be quenched quickly to freeze the reaction using transferline exchangers. This results in producing super high-pressure steam, which can be used in driving turbines in the recovery section. With higher steam to oil (S/O) ratios, ethylene yield is improved significantly. For example, at S/O=1 w/w additional 2.5 wt %, once through $C_2H_4$ yield over the conventional fired heater is achieved just by higher S/O alone. Shorter residence time will add additional ethylene yield. Higher steam to oil ratio also allows to operate at very high ethane conversions also. Ethane cracking is highly influenced by equilibrium limits. At low temperatures and low hydrocarbon partial pressures, ethane equilibrium limits the conversion ($C_2H_6 \rightarrow C_2H_4 + H_2$). Since high S/O is required to supply the necessary heat, an advantage can be taken by operating at high conversions. This will reduce the recovery section and thereby save capital expenses. Though the example is given for ethane cracking, all feeds (ethane, propane, butane, LPG, naphtha, gasoil, hydrocracked vacuum gasoil, crude, condensate, raffinates, plastic pyoil, hydrogenated vegetable oil, etc.) can be cracked. The same reactor can be used for most feeds, if not for all. At high steam to oil ratio, coke formation is also suppressed significantly. Any coke formed can also be cleaned by steam decoking only. For this hydrocarbon flow is stopped and high temperature steam reacts with coke in the adiabatic reactor and converts to $CO/CO_2$ by gasification.

A spare reactor can also be considered. Since only steam is heated, the compressor may run continuously.

Figure 4:
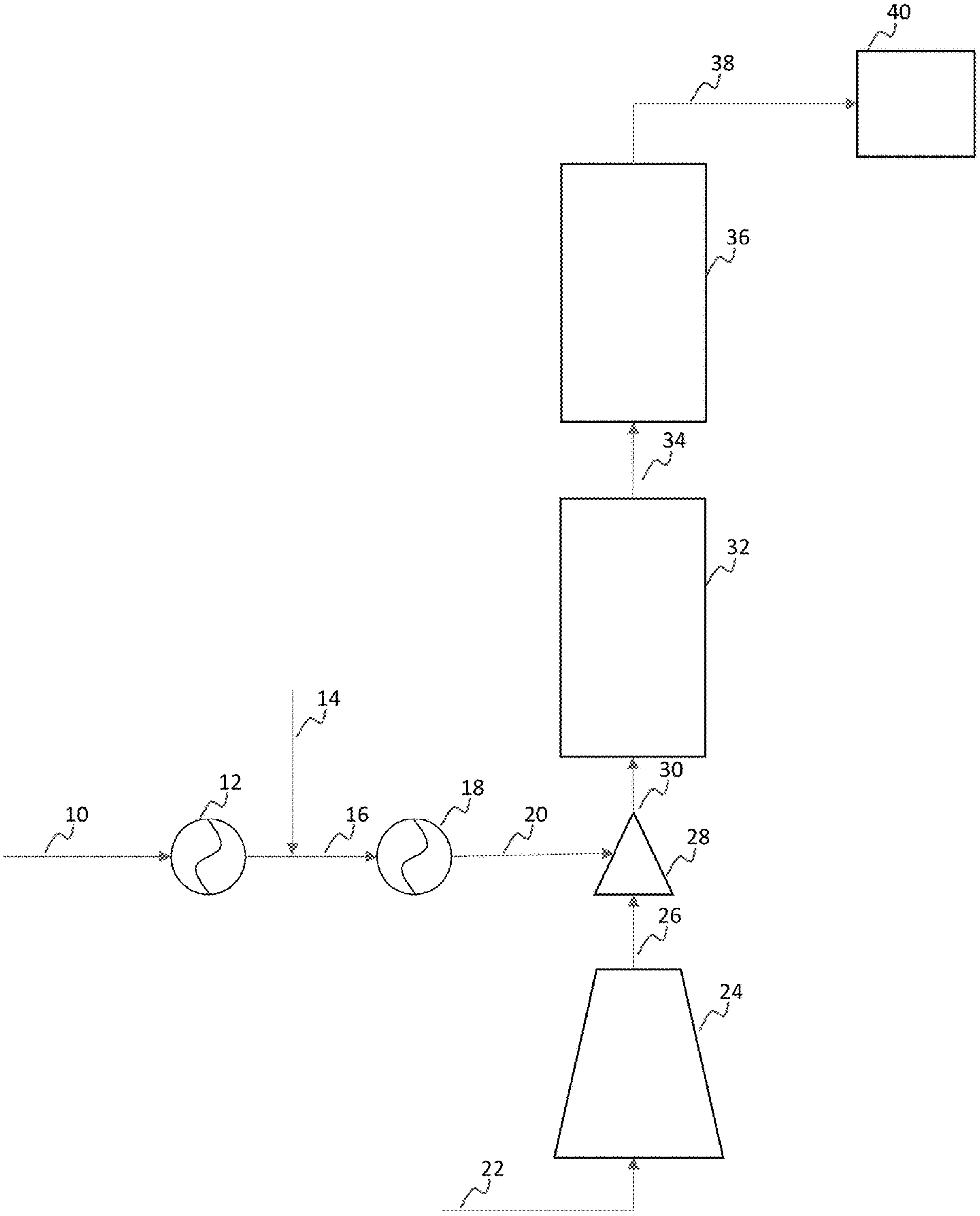
FIG. 4 illustrates a simplified process flow diagram of a system for steam cracking of hydrocarbons according to one or more embodiments disclosed herein.
Figure 5:
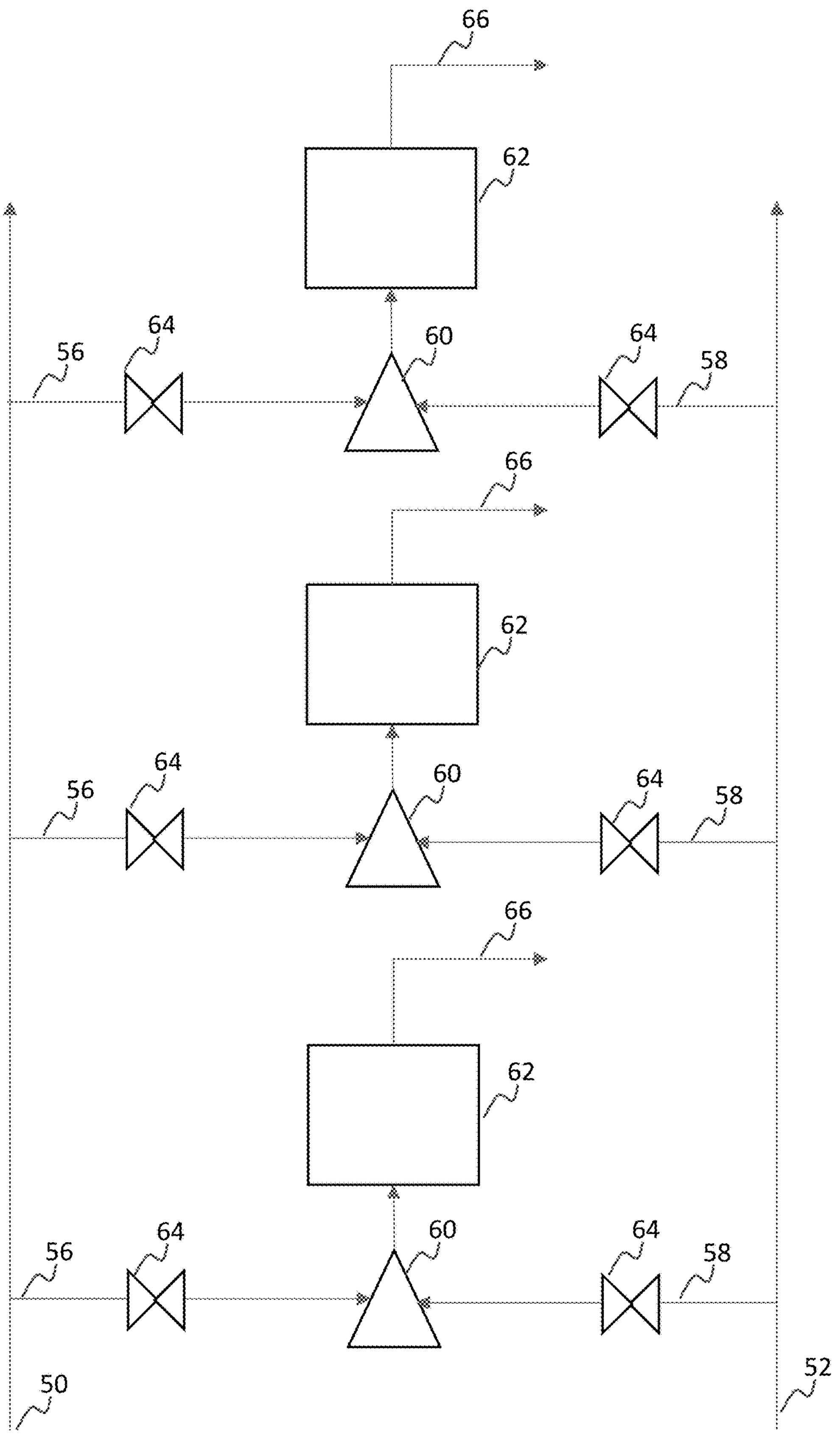
FIG. 5 illustrates a simplified process flow diagram of a system for steam cracking of hydrocarbons according to one or more embodiments disclosed herein.

In FIGS. 4 and 5, described further below, simplified sketches of the heating and reaction systems according to embodiments herein are shown. Dilution steam is compressed to high temperatures as required in a turbomachine, such as a multistage (axial) compressor. Separately, hydrocarbon feed is preheated in an exchanger using available hot source. For gas feeds, like ethane, it is another preheater. For liquid feeds it is a vaporizer. More than one exchanger can be considered. Different heating sources, including electrical heaters, can be used. During vaporization some steam can also be added to minimize coking in the exchanger. Optionally, an additional small quantity of dilution steam, sufficient to prevent coke formation in the turbomachine, is added and then sent to another secondary compressor. This will preheat the hydrocarbon and optional dilution steam to moderate temperatures. At this stage there is no significant cracking reaction in the feed and also no coke formation in the secondary compressor. The temperature is sufficient to get high mixed temperature. Instead of a secondary compressor, an electric heater can be considered. Also, a fired heater can be used. Using 100% H2 fuel in the fired preheater produces zero CO2. With fossil fuel there will be some CO2. Therefore, depending upon the requirements, electric or fired heaters can be considered. In some cases, this heating may not be necessary. In such cases, the mixed temperature will be low, and the main compressor has to supply that duty either in the form of high S/O or higher steam temperature. Superheated reaction steam from a separate turbomachine is then mixed with the pre-heated hydrocarbon feed at the inlet of adiabatic reaction section. This can be a simple drum, or a cracking coil placed in a box. The adiabatic reaction section can contain a mixing device like static mixers or other methods. Reaction proceeds in the adiabatic reactor. The outlet is connected to a transfer line exchanger. Boiler feed water may be used to cool the effluents, and this generates super high-pressure steam. Cooled reactor effluent is then sent to a recovery section.

Two adiabatic reactors can be used, and one can be used for cracking while the other is under decoking based on the previous cycle. A common spare for the plant can also be used so that many reactors share the spare. Depending upon the compressor driven by electricity the capacity of the unit varies. Multiple such units will be used for overall plant capacity.

In summary, embodiments herein relate to steam superheating using turbomachinery. Superheated steam is used to heat the hydrocarbon feed and supply the reaction heat. Generally, a high S/O ratio is required for achieving sufficient feed conversion. As a result, a significant quantity of SHP will be produced. This can be used to preheat the feed and/or superheated and used in the recovery section. So, all utilities are based on electricity. Therefore, the plant produces zero CO2 and zero NOx. This reactor does not use any fossil fuels or hydrogen. Some preheating can be done with H2 fired heaters and this will reduce the electrical import since H2 is produced in the heater and is available for firing. Therefore, some conventional heaters with H2 fuel can be considered and the remaining heaters can be of turbomachinery type of reactors to achieve the overall plant capacity. This hybrid plant also has some advantages. When total electricity fails, some heaters and hence recovery section can be maintained with steam using H2 fuel. This will improve the onstream time.

High temperature is produced using electrical energy. In some embodiments, there is no fuel fired heater, and thus no carbon-dioxide or NOx are emitted during chemicals production. By replacing the current fired heaters with turbomachinery heaters, existing plants can also achieve zero CO2 emission. The turbomachinery heaters also produce super high-pressure steam and hence turbomachines may also be used to drive the turbines in the recovery section.

As a result of the electric heating according to embodiments herein, very high temperatures can be achieved. With high temperature reaction steam and moderate temperature of hydrocarbon, enough reaction temperature can be achieved when the reaction steam is mixed with the hydrocarbon or hydrocarbon-dilution steam mixture. The reaction takes place adiabatically, and after the reaction, the reaction effluent is rapidly cooled in exchangers and sent to a product recovery section.

With a fired heater, when a fluid is heated the associated metal temperature is also hot and the achievable temperature is limited by the metallurgy. In contrast, embodiments herein utilize turbomachines to heat the reaction steam to indirectly provide heating to heat the complete reaction mixture to reaction temperatures.

The advantage of cracking hydrocarbons according to embodiments herein is significant improvement in run length and higher selectivity to olefins. When a whole reaction mixture is heated by a fired heater or by an electric heater, the heat is transferred from the heat source (flame in the case of fired heater and heating element in the case of electric heater) to the radiant tube usually by radiation. From the radiant tube to the reaction mixture heat is transferred by convection. During the process of thermal cracking the reaction mixture to produce olefins, a byproduct reaction to the formation of coke is also taking place. Therefore, coke deposits on the walls of the reactor, causing limitations in producing the olefins via fired heaters or direct electric heating. After some time, the reaction is stopped, and the reactor is cleaned by steam/air. The reaction is usually carried out in tubular reactors. The coke deposition depends upon the tube temperature. When it is heated by a fired heater or electric heater, the tube is hotter than the process (reaction) mixture. The higher the temperature, higher is the coking rate. Therefore, metal or tube temperature is limited by the amount of acceptable coke depositions. When the reaction is carried out by adiabatic mode, the fluid is hotter than the metal and hence coke deposition rate on the tube walls is reduced and hence gives rise to long run length. Thermal cracking is a homogeneous (surface to volume ratio independent) reaction while the coke forming reactions are heterogeneous in nature. As the reaction is carried out adiabatically in embodiments herein, large tube diameters can be used by keeping the residence time for the reaction minimal, and thereby minimizing the coke deposition rate. Small tube diameters are required to increase the heat transfer rate when convective heat transfer has to be used (like using a flame or electric elements to transfer the heat). In the adiabatic reactor according to embodiments herein, the inert substance (dilution steam) is heated to very high temperatures and hence there is no coke deposition. This very high temperature fluid is mixed with hydrocarbon to increase the temperature of the reaction feed mixture, and the tube temperature is equal to fluid temperature and is often low.

The method of supplying heat to the reaction according to embodiments herein is different. As a result, tube metal temperature is low. With turbomachine heating, the fluid can be heated to very high temperatures. In embodiments herein, only reaction steam is heated to very high temperatures, and hence there is no issue of severe coking in the reactor.

As described above, embodiments herein utilize electricity to heat a fluid, via a turbomachine, to supply energy to a superheated steam stream to conduct the cracking reactions. In some embodiments, there is no fired heater, and all duties are supplied by electricity or heat recovery. After preheating the hydrocarbon feed, it can be mixed with small amount of dilution steam. Dilution with a small amount of steam is not required for all types of feeds and is feed specific. For illustration purposes, a full range naphtha will be considered. Similar concepts can be applied for ethane (gas feed) to gas oils (heavy feed) or other various hydrocarbon mixtures.

Typically, in a fired heater, naphtha is heated and mixed with dilution steam at a weight ratio of 1:0.5 basis (steam to oil (S/O)=0.5 w/w) and then superheated to 600-650° C. in the convection section before entering the radiant section. In the radiant section the reaction takes place. Radiant section is heated to temperatures of 800 to 850° C. (fluid temperature) and the reaction time is typically 200 to 400 milliseconds in tubular reactors with coil ID ranging from 1 inch to 7 inches and lengths from 20 ft to 400 ft in a single pass or multi-pass tubular reactors. The reaction effluent is then cooled by generating superhigh pressure steam or high-pressure steam to 300 to 330° C.

In embodiments herein, a hydrocarbon feedstock is vaporized, for example naphtha is heated to 150-250° C., and then a small amount of steam (S/O=0.05 to 0.2 w/w) is added, and the mixture is further heated to reasonable temperatures in a range from about 400 to about 650° C. These temperatures and S/O are chosen to eliminate coking during preheating. In the presence of steam, coking is suppressed, which is why above a prescribed temperature, and depending upon the nature of the hydrocarbon feed, a small amount of steam is added and heated. The maximum temperature is kept slightly lower than typical cross over temperature and again to minimize coking during preheating or superheating the feed. Separately, the remaining steam is superheated to very high temperatures (such as greater than 950° C.). If required, additional steam can be used. The heating of the steam to these very high temperatures is done via a turbomachine (which may be powered electrically). In the reaction zone, the preheated mixture of hydrocarbon with small amount of steam is mixed with the superheated reaction steam and the reaction mixture is almost instantaneously increased to cracking temperatures. The reaction then proceeds adiabatically producing olefins.

Following a short reaction residence time, such as 30 to 160 milliseconds, the reaction effluent mixture is cooled (quenched) with a regular exchanger and then sent to further heat recovery and to the product recovery section. As the reaction takes place adiabatically, the reactor can be a tubular reactor with a large diameter or other type of vessels with appropriate residence time. As a result, the coking is reduced significantly. During the reaction there is little to no heat transfer to external media. If it is desired to improve the selectivity to olefins, a small amount of heat can be added (electrical heating) keeping the reaction temperature at slightly higher values. In this case the amount of heat added is very small just to be sufficient for maintaining the temperature. The benefit of adding heat versus slightly increased coking rate has to be judged case by case. Either option will give long run length and higher selectivity compared with conventional fired heaters. With additional heating, selectivity will be higher than the true adiabatic case. In addition, by breaking down the heating in two steps (dilution steam super heating and additional heat) less expensive alloys can be used. When heat is added in the reaction section, it is no longer referred to as an adiabatic reactor and it is called a non-isothermal and nonadiabatic reactor. Other than the nomenclature used, the performance is not affected.

When electricity is used to heat the dilution steam or to pre-heat the reaction steam, as an example, it can be achieved by radiation. In this case, the heating element is heated by electricity and radiates to the reaction tube, which is similar to a fired heater. In the direct resistance heater, the tube becomes the heating element. The resistance of the tube is used to heat. To avoid electrocution, generally low voltages are used (<100 V) and hence this mode requires very high current since the power requirement is nearly the same for all cases. Alternatively, with inductive heating the tube can be of inductive capable alloy. In addition, susceptors can be used. Susceptors are placed inside the tube producing inductive current, heating the susceptors. At that point, they act like a packed bed. Suitable susceptors have to be selected. One such material is SiC and other high temperature materials are available. Any such material can be used as a susceptor. With a packed tube, the inside heat transfer coefficient is also very high compared with empty tubular reactors. Also, the metal or tube bearing the susceptors may be inductive or may not be inductive. So, the tube temperature will not be high, and will be much lower than the radiative method.

With adiabatic operation, outlet temperature can be controlled only by controlling inlet temperature and flowrate. Higher inlet temperatures give higher selectivity. However, there are limitations in any system. To be more efficient, a small (or low) conversion of the feed before adding steam is acceptable. At low conversions, the selectivity to olefins is not affected. The feed contains a small amount of steam and hence the coking rate is not high. When conversion has to be maintained or adjusted, again induction heating to the tube in the adiabatic portion can be used. This provides some heat and keeps the gas temperature high. Of course, this increases the potential for coking. Therefore, optimum dilution steam and temperature should be used for best yields. Instead of supplying heat at the outlet, increasing the inlet temperature with slightly higher inlet conversion is preferred. By this approach, the reactor operates always as adiabatic and hence run length is not affected.

Referring now to FIG. 4, a simplified process flow diagram of a system for steam cracking of hydrocarbons according to one or more embodiments disclosed herein is illustrated. A hydrocarbon feedstock 10, such as naphtha, is preheated in an exchanger 12 to moderate temperatures. Depending upon the feed characteristics, an optional small amount of dilution steam 14 may be added. This amount of dilution steam is typically 0.05 to 0.1 w/w of hydrocarbon and for some heavy feeds it can be as high as 0.6 to suppress coking during vaporization. The mixed feed 16 of hydrocarbon plus dilution steam (HC+DS) is again heated in an exchanger 18 to medium temperatures, resulting in a heated mixed feed 20. Instead of an exchanger, an electrical heater can be employed for this heating of the mixed feed 16. By employing an electrical heater, superhigh pressure steam production can be maximized which can be used in the recovery section. So optimum method of heat transfer medium may be chosen based upon the location, feed type and operating conditions.

Embodiments herein are based on electrical heating for simplicity. For this heating any type of electrical heating can be employed. The hydrocarbon feed is typically heated from 200° C. to 650° C. in this exchanger or heater 18. By using an induction heater heat transfer can be improved without coking since heat is generated in the susceptors. Instead of induction heating, a radiative heater (using electrical elements) or a direct resistance heater (electricity is directly applied on the heating coil or vessel) can also be used to preheat the hydrocarbon feed. At these outlet temperatures, the feed conversion is very low (<2%) and hence there is generally no issue of coke formation. However, depending upon the feed and the coil design used for this preheating to higher outlet temperature, some additional conversion can be considered. For example, instead of limiting the temperature to 650° C. for a naphtha feed, increasing the temperature to 700° C. will result in some feed conversion. This results in lower dilution steam duty that will be mixed later. Optimum depends upon case by case, such as by feed type and method of heating.

The remaining steam, reaction steam 22, is superheated in a turbomachine 24 to provide superheated reaction steam 26. Turbomachine 24 may be a linear compressor, for example. Since only steam is heated in turbomachine 24, the steam can be heated to very high temperatures. With a turbomachine, higher steam temperature than other modes, such as radiative heating, can be achieved. With a fired heater, due to limitations in metallurgy, achieving steam temperatures higher than 925° C. is difficult. With turbomachines, the steam can be heated very easily to higher than 1000° C.

The superheated reaction steam 26 and the preheated hydrocarbon feedstock 20 are then mixed in a mixing device 28. Mixing device 28 may be a simple mixing tee, in some embodiments, or may include static mixers or other devices to facilitate intimate mixing of the reaction steam and preheated hydrocarbon feedstock.

After the high temperature reaction steam 26 is mixed with the preheated hydrocarbon plus steam mixture 20 in a mixer 28, forming reaction mixture 30, the reaction then proceeds adiabatically in reactor 32. The mixing zone 28 can be inside the adiabatic reactor 32 (e.g., integral) or outside (e.g., fluidly connected to the reactor). The adiabatic reactor 32 can be internally insulated or outside insulated. Mixing is fluid-fluid type mixing. Special mixing devices can be used to promote mixing. A simple T or Y type mixing device can also be used. Static mixers can also be used. Due to turbulence, the reaction mixture 30 quickly attains the adiabatic temperature. This reaction temperature, in embodiments herein, is much higher (>900° C.) than normally encountered in typical fired pyrolysis heaters. The cracking reaction proceeds and as a result the temperature drops as the reaction is endothermic. The drop in temperature depends upon the level of conversion. Since the reaction proceeds adiabatically, it depends upon the volume and does not depend upon the surface area. Surface area is required only when there is heat transfer from external to internal or vice versa. Therefore, a large diameter pipe or vessel can be chosen with low external surface area for reactors 32 according to embodiments herein. Coking depends upon the surface area. Since surface area is minimized, coke deposition is minimized and hence no additional pressure drop results due to coking. The volume of the adiabatic reaction section controls the residence time. By properly choosing the flowrates for the given volume and by properly choosing dilution steam flow rates and hydrocarbon feed rates and preheated inlet temperature and superheated dilution steam temperature, high conversion can be achieved. Inductive heating can also be used after mixing in reactor 32, reactor 32 then operating as a non-isothermal nonadiabatic reactor.

Like any pyrolysis reaction, the reaction has to be quenched to preserve the olefins. After the adiabatic reactor, the reaction effluent 34 is quenched using a transferline exchanger 36. Transferline exchanger 36 can be a shell and tube or a double pipe exchanger, for example. Alternatively, direct quenching of the reaction effluent 34 with oil, steam or water is also acceptable. Before quenching it is preferable to get reasonable outlet temperature (>750° C.) so that olefin selectivity is maintained.

After quenching, the procedure is similar to conventional pyrolysis reactor systems. The quenched reaction effluent 38 may be fed downstream to cooling, heat recovery, and separation system 40. Secondary transferline exchangers to generate steam or preheat the feed or other fluids and tertiary exchangers to preheat the feed or to generate low pressure steam or preheat other fluids are acceptable.

Again, any feed from ethane to vacuum gasoil can be used to produce olefins. Any amount of steam from 0.05 to 5 w/w steam to hydrocarbon can be used. Without steam, coking tendency is high and hence a no steam case is not recommended. Very high steam to oil ratios may not be economical but are acceptable. The split of primary steam (mixed with naphtha for preheating) and secondary, reaction, steam (heated alone to high temperatures) can vary from 0 to 1.0.

When there is significant coke deposition, the whole system can be online cleaned with a steam/air mixture or steam alone. If equipment downstream of the mixer has to be cleaned, high temperature steam can be used. This will convert coke to CO/CO2 by steam reforming reactions. Air (ambient or enriched) can be used and that burns coke to CO/CO2. The same air can be used to clean the preheat section, if needed. Air cleaning is required in low temperature zones only.

As described above for embodiments herein, the hydrocarbon plus dilution steam mixture is preheated. Generally, the preheated outlet temperature is kept at moderate level so that conversion of the feed is low or almost nil. To minimize the steam dilution and to minimize the maximum superheated dilution temperature, it is preferable to have some conversion (but small) and to have a high cross over temperature. At low conversions (<30%) coking rate is low. At these low conversions, concentrations of byproducts are low. The final product distribution is not dependent on cross over temperature of small initial conversion. The selectivity increases with reactor outlet temperature. Therefore, for each feed, as high a cross over temperature as possible is preferred. In this context, a small amount of dilution steam added is helpful to suppress coke formation.

As illustrated in FIG. 4, a single stream is used in the example. However, embodiments herein are not limited to single stream reaction systems (one hydrocarbon feed, one reaction steam feed, one mixer, one adiabatic reactor, etc.). Referring now to FIG. 5, FIG. 5 shows a multiple streams/reactor concept, and may utilize as many mixing/reaction units as desired. As illustrated in FIG. 5, a preheated hydrocarbon feed or a preheated hydrocarbon plus a small amount of dilution steam feed stream may be provided to a hydrocarbon flow header 50. Reaction steam may be provided to a reaction steam header 52. The respective headers 50, 52 may then provide hydrocarbon and reaction steam to multiple mixing/reaction/quench systems. Each mixing/reaction/quench system may include an inlet tube 56 for providing hydrocarbon from header 50 and an inlet tube 58 for providing reaction steam from header 52 to mixers 60 and reaction coils 62, producing cracked effluents 66 that may then be quenched and fed to a heat recovery and separation zone as described above with respect to FIG. 4. Quench may be performed by collectively or individually quenching the reaction effluent streams 66; in some embodiments each of the two or more reaction coils 62 is fluidly connected to a respective quench system, and in other embodiments, each of the two or more reaction coils 62 is fluidly connected to a collective quench system. Flow distribution to the multiple reaction coils and/or multiple inlet tubes may be controlled by flow control devices 64, which may be valves, flow venturis, or equivalent orifice plates used to distribute the flows uniformly to each mixer/reactor/quench system. In this arrangement many small reaction coils can be used, if economically attractive or providing a desired operating flexibility.

In some embodiments, the reaction coils as illustrated in FIG. 5 may be collectively grouped in a reaction bank, fluidly connected to a common steam drum and other utilities. For example, a reactor system including 2 to 20 reaction coils may be provided, in a common housing, where each of the reaction coils is fluidly connected to a hydrocarbon header and a steam header. This may be considered as a single reactor system having multiple reaction coils. In other embodiments, such as in FIG. 4, an adiabatic reactor may include only one large tube that is used as a reactor.

In other embodiments, a housing may contain multiple mixing/reaction systems, but may be provided hydrocarbons from multiple sources, such as a portion of the reaction coils being fluidly connected to a gas oil supply, and other reaction coils being fluidly connected to a naphtha supply. In this manner, a common steam source may be used to crack multiple feedstocks. As with other embodiments, such a system may include individual or collective quench systems.

As illustrated in FIG. 4, heating of the hydrocarbon or hydrocarbon plus dilution steam, as well as heating of the reaction steam is illustrated across a single turbomachine, exchanger, or heater. Preheating of the hydrocarbon feed or dilution steam super heating can also be accomplished in multi-pass coil arrangements according to embodiments herein. The adiabatic reactor can also be a multi-pass coil (tubular) reactor instead of a large vessel. When tubular reactors are used, if additional heating is required, they can be supplemented with electrical heating when susceptor type of induction heating is used. Dilution steam superheating can also be an exchanger type if a turbomachine or an electrical heater is not used. Similarly, exchanger type heating can also apply to hydrocarbon feed preheating.

With this approach the steam and the reaction mixture can be heated to very high temperatures (>1000° C.). Note that in the adiabatic section induction heating with and without susceptors can also be used. In place of susceptors, simple inert or catalyst packing can also be employed. With inert packing it promotes heat transfer only. Heating can be done with induction heating to the tubes or by radiative or direct heating by electricity. Since the adiabatic section performance is based on volume basis it can be a tubular reactor or a vessel.

There are advantages of using steam as the heating medium according to embodiments herein. Steam is an inert material and hence without fear of coking it can be heated to very high temperatures. Unlike air, it has high specific heat and good thermal properties. It is easily available in pure form and can be recirculated after condensing. It suppresses the coke formation in thermal cracking. With more dilution steam added, the partial pressure (and also the residence time) is reduced, improving the olefin selectivity.

Figure 6:
FIGS. 6 and 7 illustrate ethylene yield curves illustrating expected ethylene yields, as a function of temperature and residence time for naphtha cracking, that may be achieved according to one or more embodiments disclosed herein.
Figure 7:

The increase in steam to oil (hydrocarbon) ratio to ethylene yield at constant severity for a naphtha feed is shown in FIG. 6. With increased steam to oil ratios, the maximum steam temperature required to achieve a desired conversion can be reduced. Also, it produces less fuel components like methane or fuel oil. At constant steam to oil ratio, increasing the steam temperature increases the volumetric flowrate of reaction mixture. For the fixed adiabatic volume, it reduces the residence time. Reducing the residence time to achieve the same severity also increases the ethylene yield. This is shown in FIG. 7.

As described above for embodiments herein, turbomachine heating, or a combination of turbomachine and electrical heating can be used to thermally crack hydrocarbon feeds to produce olefins. By heating the steam and mixing the superheated reaction steam with preheated hydrocarbon (or hydrocarbon and dilution steam mixture), the resulting thermal cracking produces a significant amount of olefins. Coke deposition is minimized, and long run length can be achieved. Reducing the residence time with higher steam temperatures also increases the ethylene yield. In all cases when ethylene yield is increased at constant severity, valuable byproducts like propylene and butadiene are also increased. There is also a corresponding reduction of aromatics and fuel gas and fuel oil yields at higher steam temperatures. By controlling the flow rate and temperatures, severity can also be changed. As such, embodiments herein are good for all types of hydrocarbons to produce olefin and for all cases long run length can be obtained. The reactor can be easily on-line cleaned with steam/air mixture.

Further, advantageously, embodiments herein remove the potential for fouling from any turbomachinery used to provide heat. If a mixture of hydrocarbon and steam were processed in a turbomachine to heat and crack within the turbomachine, small clearances between turbine blades and vessel walls can quickly get clogged with coke byproducts, and thus long run times cannot be envisioned. Further, coke may form on the turbine blades themselves, resulting in loss of balance and the need for shut down and cleaning. While coatings and other means for delaying coking of a turbomachine may be provided, such are expensive, may not provide complete or long-lasting coverage, and may only briefly delay the inevitable need for a shutdown to remove a small amount of accumulated coke. Embodiments herein, separating the heating of steam and the cracking reaction avoid such issues and provide for extremely long run time in the adiabatic reactors, which have a much larger diameter as compared to the clearances in turbomachines and can tolerate some amount of coking.

All prior turbomachinery approaches heat both hydrocarbon and dilution steam together, and any time when a hydrocarbon mixture is heated to high temperatures, coke will form. Such coke will affect the turbomachinery operation. In embodiments herein, only steam is heated, and coke is not formed in the valuable turbomachine. When a compressor breaks down, repair time is also high. Hence by improving the stability, onstream time is improved. The reaction is carried out in a separate vessel and hence coke deposits in this vessel. A spare vessel can be used for continuous operation while the other vessel is cleaned. Only steam is heated. So, by controlling the quantity of steam and by controlling the quantity of hydrocarbon, conversion levels can be controlled. Start-up and shut down times are very quick.

While embodiments herein described above contemplate heating of steam only within turbomachinery, other embodiments contemplate heating of steam only to pre-reaction temperatures within a first turbomachinery heating stage, and then mixing the pre-heated steam and hydrocarbon for heating within a second turbomachinery heating stage, where the first and second stages are conducted in separate turbomachines. Thermal cracking produces coke as a byproduct and hence coking inside the turbomachinery is unavoidable. By coating the machinery, catalytic contribution of coking can be reduced. When such coatings are available, both hydrocarbon and steam can be present in the turbomachinery and the reaction can be carried out inside turbomachinery. Generally many stages (5 to 10 stages) of axial compression is required to achieve suitable thermal conversion. With or without the coating, the last one or last couple of stages of the turbomachinery will be used to conduct the desired cracking. In this approach, in one turbomachine steam is preheated at high temperatures as described above. High temperature steam is then mixed with hydrocarbon and the reaction is carried out in one stage of the axial compressor where the thermal cracking reactions proceed to produce olefins. By this way the reaction is not adiabatic, but some energy is provided by the turbomachinery also. As a result the drop in process temperature is reduced and the reaction is carried in less (short) residence time in one stage preferrentially. If necessary more than one stage can be employed. Only the reaction portion of the turbomachinery has to be spared and steam side does not require sparing to account for coking. This reduces the required capital and improves the reliability of the system. The mixed system has some process benefits compared to the complete adiabatic temperature system such has high olefin selectivity, relatively low hot steam temperature etc. However, this has higher coking rate in the reaction zone. Depending upon the case, either 100% adiabatic (one turbomachinery) or mixed cracking (two turbomachines, one for steam and one for cracking), can be considered. Since the turbomachinery is almost identical, the system can be designed to operate both ways with appropriate piping arrangements.

Figure 8:
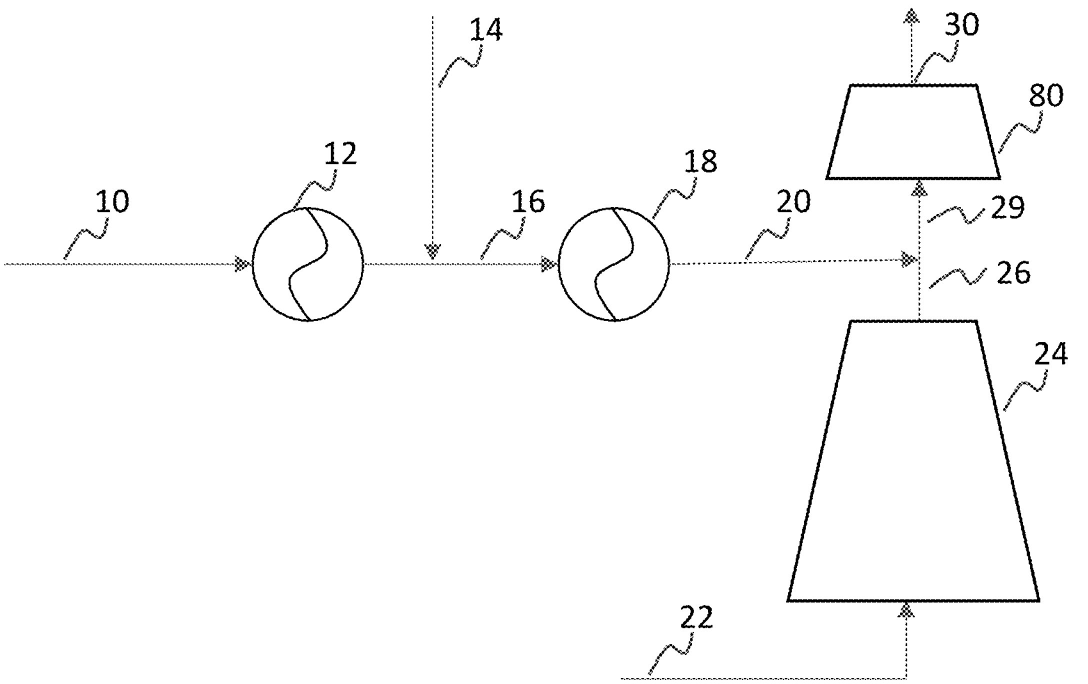
FIG. 8 illustrates a simplified process flow diagram of a system for steam cracking of hydrocarbons according to one or more embodiments disclosed herein.

Referring again to FIG. 1, steam may increase in temperature by 150° C. to 300° C. in a single turbomachine stage. This temperature rise may be used to heat and react a steam-hydrocarbon mixture in a single stage turbomachine. According to embodiments herein, and as illustrated in FIG. 8, where like numerals represent like parts, steam 22 may be heated in a multi-stage turbomachine 24 to a temperature just below a temperature at which cracking reactions occur (cracking onset temperature). For example, the multi-stage turbomachine may be used to raise the temperature of steam 22 from a temperature in a range of 250° C. to 500° C. to produce a superheated steam 26 at a temperature in a range of 600° C. to 750° C. Other temperatures may be used and may be dependent upon the heat recovery system and hydrocarbons being processed. The superheated steam 26 may then be mixed with a pre-heated hydrocarbon (10, 20) or pre-heated hydrocarbon steam mixture (10+14=20) (respectively as described above with respect to FIG. 4), also at a temperature below a temperature at which cracking occurs to any significant extent. The resulting reaction mixture 29 of both preheated steam and preheated hydrocarbon may also be at a temperature below a cracking temperature. Then, in a single stage turbomachine 80, the steam-hydrocarbon reaction mixture may be heated rapidly to a temperature at which cracking reactions occur. Alternatively, a two stage or other multi-stage turbomachine may be used for this final heating and reaction step. In either case, the sparing of a smaller turbomachine and separating the heating of primary steam and hydrocarbon (or hydrocarbon plus dilution steam) until the final reaction stage(s) in the second turbomachine 80 provides for sparing of a smaller turbomachine reactor, which reduces required capital and improves reliability of the system, as noted above. The resulting reaction effluent may then be forwarded downstream for heat recovery and cracked hydrocarbon recovery as also described with respect to FIG. 4.

As noted above, the systems of FIG. 4 and FIG. 8 may be concurrently used. The cracking of low temperature crackable feeds (e.g., 750-900° C. cracking temperatures) may be processed in a system similar to FIG. 8, while feeds that are preferentially cracked at higher temperatures (e.g., >950° C.) may be processed in a system similar to FIG. 4. The resulting effluents may then be processed for heat recovery and product recovery, where portions of each may collectively process multiple reactor effluents.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed is:

1. A process of cracking hydrocarbons to produce olefins, the process comprising:
- heating a hydrocarbon feedstock or a mixture comprising steam and hydrocarbons to a first temperature to form a preheated feed;
- heating steam to a second, higher, temperature in a turbomachine to form a superheated reaction steam;
- mixing the preheated feed with the superheated reaction steam to form a reaction mixture at a cracking temperature, and cracking the hydrocarbons to form olefins, producing a reaction effluent;
- quenching the reaction effluent; and
- separating the reaction effluent to recover the olefins.

2. The process of claim 1, wherein heating the hydrocarbon feedstock or the mixture comprises heating via one or more of:
- inductively heating the mixture;
- electrically radiatively heating the mixture;
- heating the mixture using direct resistance type electrical heating elements;
- heating the mixture via indirect heat exchange with an electrically heated heat exchange medium or the reaction effluent; or
- combinations of two or more of these heating methods.

3. The process of claim 1, wherein the first temperature is a temperature in a range from 150° C. to 750° C.

4. The process of claim 1, wherein the second temperature is a temperature in a range from 950° C. to 1400° C.

5. The process of claim 1, wherein the cracking temperature is a temperature in a range from 900° C. to 1300° C.

6. The process of claim 1, wherein a residence time of the cracking is in a range from 10 to 500 milliseconds.

7. The process of claim 1, wherein the cracking is adiabatic.

8. The process of claim 1, wherein the cracking is non-isothermal and nonadiabatic.

9. The process of claim 1, wherein the mixture comprises steam and hydrocarbons at a steam to hydrocarbon ratio in a range from 0.05 to 0.6 (w/w).

10. The process of claim 1, wherein the reaction mixture comprises steam and hydrocarbons at a steam to hydrocarbon ratio in a range from 0.05 to 5 (w/w).

11. The process of claim 1, further comprising preheating a hydrocarbon stream and mixing the hydrocarbon stream with steam to form the mixture.

12. A system for cracking hydrocarbons to produce olefins, comprising:

a heating system configured for heating a mixture comprising steam and hydrocarbons to a first temperature to form a preheated mixture;

a heating system comprising a turbomachine configured for heating steam to a second, higher, temperature to form a superheated reaction steam;

a mixing system configured for mixing the preheated mixture with the superheated reaction steam to form a reaction mixture at a cracking temperature;

an adiabatic reaction zone for adiabatically cracking the hydrocarbons to form olefins, producing a reaction effluent having a fourth temperature;

a quench system for quenching the reaction effluent; and a separation system for separating the reaction effluent to recover the olefins.

13. The system of claim 12, wherein the turbomachine comprises an axial compressor.

14. The system of claim 12, wherein the mixing system comprises a Y-type mixing device.

15. The system of claim 12, wherein the mixing system comprises a static mixer.

16. The system of claim 12, wherein the mixing system comprises a venturi mixer.

17. The system of claim 12, wherein the mixing system comprises two or more mixers, and wherein the adiabatic reaction zone comprises two or more adiabatic reactors, the system further comprising a hydrocarbon feed header for supplying the preheated mixture to each of the two or more mixers, a reaction steam header for supplying the superheated reaction steam to the two or more mixers, and wherein each of the two or more mixers is fluidly connected to or integral with a respective adiabatic reactor.

18. The system of claim 17, wherein the quench system comprises a plurality of quench zones, wherein a reaction effluent from each of the two or more adiabatic reactors is fluidly connected to a separate quench zone.

19. The system of claim 17, wherein a reaction effluent from each of the two or more adiabatic reactors is fluidly connected to a collective quench system.

20. A process of cracking hydrocarbons to produce olefins, the process comprising:

heating a hydrocarbon feedstock or a mixture comprising steam and hydrocarbons to a first temperature to form a preheated feed;

heating steam in a turbomachine to form a superheated steam;

mixing the preheated feed with the superheated steam to form a reaction mixture having a temperature below a cracking temperature;

heating the reaction mixture in single stage turbomachine to a cracking temperature, and cracking the hydrocarbons to form olefins, producing a reaction effluent;

quenching the reaction effluent; and separating the reaction effluent to recover the olefins.

21. A system for cracking hydrocarbons to produce olefins, comprising:

a first heating system configured for heating a mixture comprising steam and hydrocarbons to a first temperature to form a preheated mixture;

a second heating system comprising a turbomachine configured for heating steam to form a superheated steam having a temperature below a cracking temperature;

a mixing system configured for mixing the preheated mixture with the superheated steam to form a reaction mixture having a temperature below a cracking temperature;

a single stage turbomachine for heating the reaction mixture to a cracking temperature and cracking the hydrocarbons to form olefins, producing a reaction effluent;

a quench system for quenching the reaction effluent; and a separation system for separating the reaction effluent to recover the olefins.

* * * * *